US008053249B2

(12) United States Patent
Beebe et al.

(10) Patent No.: US 8,053,249 B2
(45) Date of Patent: Nov. 8, 2011

(54) METHOD OF PUMPING FLUID THROUGH A MICROFLUIDIC DEVICE

(75) Inventors: David J. Beebe, Monona, WI (US); Jay W. Warrick, Madison, WI (US); Michael W. Toepke, Madison, WI (US); Ivar Meyvantsson, Madison, WI (US); Glenn M. Walker, Cary, NC (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1275 days.

(21) Appl. No.: 11/684,949

(22) Filed: Mar. 12, 2007

(65) Prior Publication Data

US 2010/0288368 A1 Nov. 18, 2010

(51) Int. Cl.
*G01N 1/10* (2006.01)
*G01N 1/00* (2006.01)

(52) U.S. Cl. ........... 436/180; 422/50; 422/68.1; 436/43; 436/52; 436/53; 137/8; 137/9; 137/12; 137/14

(58) Field of Classification Search .................. 436/180, 436/43, 52, 53; 422/50, 68.1, 500, 502, 504, 422/505, 509; 137/8, 9, 12, 14
See application file for complete search history.

(56) References Cited

U.S. PATENT DOCUMENTS 6,012,902 A 1/2000 Parce
6,090,251 A 7/2000 Sundberg et al.
6,171,067 B1 1/2001 Parce
6,174,675 B1 * 1/2001 Chow et al. ........................ 435/6
6,210,128 B1 * 4/2001 Rife et al. ...................... 417/322
6,224,728 B1 * 5/2001 Oborny et al. ................ 204/450
6,262,519 B1 7/2001 Furlani et al.
6,274,089 B1 8/2001 Chow et al.
6,296,452 B1 10/2001 Caren
6,318,970 B1 11/2001 Backhouse
6,368,562 B1 4/2002 Yao
6,739,576 B2 5/2004 O'Connor et al.
6,767,706 B2 7/2004 Quake et al.
6,949,176 B2 9/2005 Vacca et al.
7,156,969 B2 1/2007 Mehta et al.
7,189,580 B2 * 3/2007 Beebe et al. .................. 436/180
2003/0203506 A1 10/2003 Beebe et al.
2004/0115830 A1 6/2004 Touzov
2007/0034270 A1 2/2007 Yang et al.

OTHER PUBLICATIONS

"Macro-to-Micro Interfaces for Microfluidic Devices", Miniaturization for Chemisty, Biology & Bioengineering; vol. 4, pp. 526-533, Jul. 13, 2004, by Carl K. Fredrickson and Z. Hugh Fan.
"Well-Plate Formats and Microfluidics-Applications of Laminar Fluid Diffusion Interfaces to HTP Screening", Micro Total Analysis Systems 2001, pp. 383-384, by Bernard H. Weigl et al.

* cited by examiner

*Primary Examiner* — Brian J Sines
(74) *Attorney, Agent, or Firm* — Boyle Fredrickson, S.C.

(57) ABSTRACT

A method is provided for pumping fluid through a channel of a microfluidic device. The channel has an input port and an output port. The channel is filled with fluid and a pressure gradient is generated between the fluid at the input port and the fluid at the output port. As a result, fluid flows through the channel towards the output port.

13 Claims, 3 Drawing Sheets

METHOD OF PUMPING FLUID THROUGH A MICROFLUIDIC DEVICE

REFERENCE TO GOVERNMENT GRANT

This invention was made with United States government support awarded by the following agencies: DOD ABPA F30602-00-2-0570. The United States has certain rights in this invention.

FIELD OF THE INVENTION

This invention relates generally to microfluidic devices, and in particular, to a method of pumping fluid through a channel of a microfluidic device.

BACKGROUND AND SUMMARY OF THE INVENTION

As is known, microfluidic devices are being used in an increasing number of applications. However, further expansion of the uses for such micro fluidic devices has been limited due to the difficulty and expense of utilization and fabrication. It can be appreciated that an efficient and simple method for producing pressure-based flow within such microfluidic devices is mandatory for making microfluidic devices a ubiquitous commodity.

Several non-traditional pumping methods have been developed for pumping fluid through a channel of a microfluidic device, including some which have displayed promising results. However, the one drawback to almost all pumping methods is the requirement for expensive or complicated external equipment, be it the actual pumping mechanism (e.g., syringe pumps), or the energy to drive the pumping mechanism (e.g., power amplifiers). The ideal device for pumping fluid through a channel of a microfluidic device would be semi-autonomous and would be incorporated totally at the microscale.

The most popular method of moving a fluid through a channel of a microfluidic device is known as electrokinetic flow. Electrokinetic flow is accomplished by conducting electricity through the channel of the microfluidic device in which pumping is desired. While functional in certain applications, electrokinetic flow is not a viable option for moving biological samples through a channel of a microfluidic device. The reason is twofold: first, the electricity in the channels alters the biological molecules, rendering the molecules either dead or useless; and second, the biological molecules tend to coat the channels of the microfluidic device rendering the pumping method useless. Heretofore, the only reliable way to perform biological functions within a microfluidic device is by using pressure-driven flow. Therefore, it is highly desirable to provide a more elegant and efficient method of pumping fluid through a channel of a microfluidic device.

In addition, as biological experiments become more complex, an unavoidable fact necessitated by the now apparent complexity of genome-decoded organisms, is that more complex tools will be required. Presently, in order to simultaneously conduct multiple biological experiments, plates having a large number (e.g. either 96 or 384) of wells are often used. The wells in these plates are nothing more than holes that hold liquid. While functional for their intended purpose, it can be appreciated that these multi-well plates may be used in conjunction with or may even be replaced by microfluidic devices.

To take advantage of existing hardware, "sipper" chips have been developed. Sipper chips are microfluidic devices that are held above a traditional 96 or 384 well plate and sip sample fluid from each well through a capillary tube. While compatible with existing hardware, sipper chips add to the overall complexity, and hence, to the cost of production of the microfluidic devices. Therefore, it would be highly desirable to provide a simple, less expensive alternative to devices and methods heretofore available for pumping fluid through a channel of a microfluidic device.

Therefore, it is a primary object and feature of the present invention to provide a method of pumping fluid through a channel of a microfluidic device which is simple and inexpensive.

It is a further object and feature of the present invention to provide a method of pumping fluid through a channel of a microfluidic device which is semi-autonomous and requires only minimal additional hardware.

It is a still further object and feature of the present invention to provide a method of pumping fluid through a channel of a microfluidic device which is compatible with preexisting robotic high throughput equipment.

In accordance with the present invention, a method of pumping sample fluid through a channel of a microfluidic device is provided. The method includes the step of providing the channel with an input and an output. The channel is filled with a channel fluid. A first pumping drop of the sample fluid is deposited at the input of the channel such that the first pumping drop flows into the channel through the input.

A second pumping drop of the sample fluid may be deposited at the input of the channel after the first pumping drop flows into the channel. The input of the channel has a predetermined radius and the first pumping drop has a radius generally equal to the predetermined radius of the input of the channel. The first pumping drop has an effective radius of curvature and the fluid at the output has an effective radius of curvature. The effective radius of curvature of the fluid output is greater than the effective radius of curvature of the first pumping drop.

The first pumping drop has a user selected volume and projects a height above the microfluidic device when deposited at the input of the channel. The radius of the first pumping drop is calculated according to the expression:

$$R = \left[\frac{3V}{\pi} + h^3\right]\frac{1}{3h^2}$$

wherein: R is the radius of the first pumping drop; V is the user selected volume of the first pumping drop; and h is the height of the first pumping drop above the microfluidic device.

The method may include the additional step of sequentially depositing a plurality of pumping drops at the input of the channel after the first pumping drop flows into the channel. Each of the plurality of pumping drops is sequentially deposited at the input of the channel as the previously deposited pumping drop flows into the channel. The first pumping drop has a volume and the plurality of pumping drops have volumes generally equal to the volume of the first pumping drop. It is contemplated for the channel fluid to be the sample fluid.

The method may also include the additional step of varying the flow rate of first pumping drop through the channel. The channel has a cross-sectional area and the step of varying the flow rate of first pumping drop through the channel includes the step of reducing the cross-sectional area of at least a portion of the channel.

In accordance with a still further aspect of the present invention, a method of pumping fluid is provided. The method includes the step of providing a microfluidic device having a channel therethough. The channel includes a first input port and a first output port. The channel is filled with fluid and a pressure gradient is generated between the fluid at the input port and the fluid at the output port such that the fluid flows through the channel towards the output port.

The step of generating the pressure gradient includes the step of sequentially depositing pumping drops of fluid at the input port of the channel. Each of the pumping drops has a radius generally equally to the predetermined radius of the input port of the channel. Each of the pumping drops has an effective radius of curvature and the fluid at the first output port has an effective radius of curvature. The effective radius of curvature of the fluid at the output port is greater than the effective radius of curvature of each pumping drop.

The channel has a resistance and each of the pumping drops has a radius and a surface free energy. The fluid at the first output port has a height and a density such that the fluid flows through the channel at a rate according to the expression:

$$\frac{dV}{dt} = \frac{1}{Z}\left(\rho gh - \frac{2\gamma}{R}\right)$$

wherein: dV/dt is the rate of fluid flowing through the channel; Z is the resistance of the channel; ρ is the density of the fluid at the first output port; g is gravity; h is the height of the fluid at the output port; γ is the surface free energy of the pumping drops; and R is the radius of the pumping drops.

In accordance with a still further aspect of the present invention, a method of pumping fluid through a channel of a microfluidic device is provided. The channel has a first input port and an output port. The channel is filled with fluid and pumping drops of fluid are sequentially deposited at the first input port of the channel to generate a pressure gradient between fluid at the input port and fluid at the output port. As a result, the fluid in the channel flows toward the output port.

Each of the pumping drops has an effective radius of curvature and the fluid at the first output port has an effective radius of curvature. The effective radius of curvature of the fluid at the output port is greater than the effective radius of curvature of each pumping drop. In addition, each of the pumping drops has a radius generally equally to the predetermined radius of the input port of the channel.

The method may also include the additional step of varying the flow rate of first pumping drop through the channel. The channel has a cross-sectional area and the step of varying the flow rate of first pumping drop through the channel includes the step of reducing the cross-sectional area of at least a portion of the channel.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
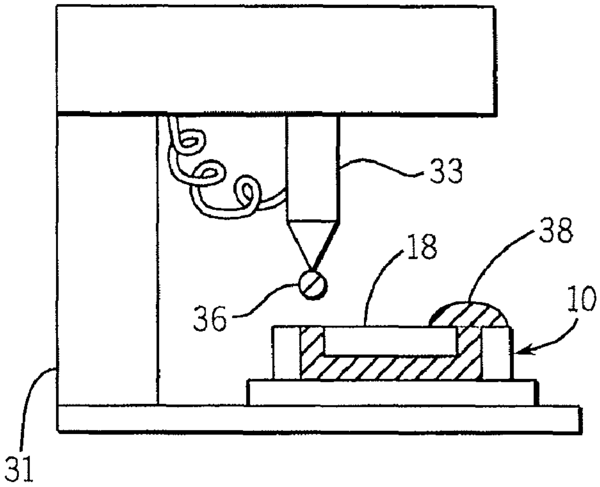
FIG. 1 is a schematic view of a robotic micropipetting station for depositing drops of liquid on the upper surface of a microfluidic device.

Referring to FIGS. 1 and 3-6, a microfluidic device for use in the method of the present invention is generally designated by the reference numeral 10. Microfluidic device 10 may be formed from polydimethylsiloxane (PDMS), for reasons hereinafter described, and has first and second ends 12 and 14, respectively, and upper and lower surfaces 18 and 20, respectively. Channel 22 extends through microfluidic device 10 and includes a first vertical portion 26 terminating at an input port 28 that communicates with upper surface 18 of microfluidic device 10 and a second vertical portion 30 terminating at an output port 32 also communicating with upper surface 18 of microfluidic device 10. First and second vertical portions 26 and 30, respectively, of channel 22 are interconnected by and communicate with horizontal portion 34 of channel 22. The dimension of channel 22 connecting input port 28 and output port 32 are arbitrary.

Figure 2:
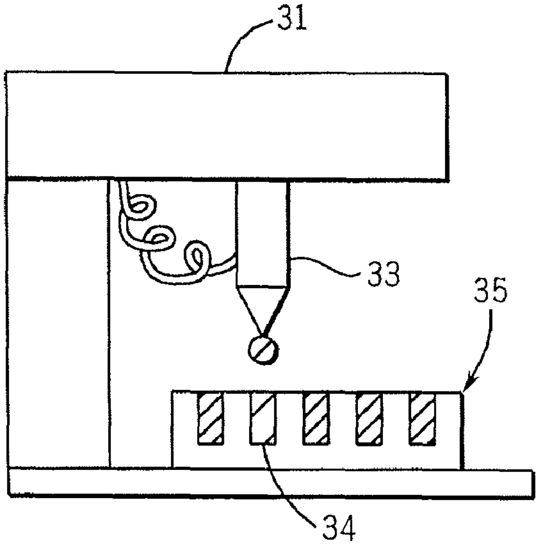
FIG. 2 is a schematic view of the robotic micropipetting station of FIG. 1 depositing drops of liquid in a well of a multi-well plate.
Figure 3:
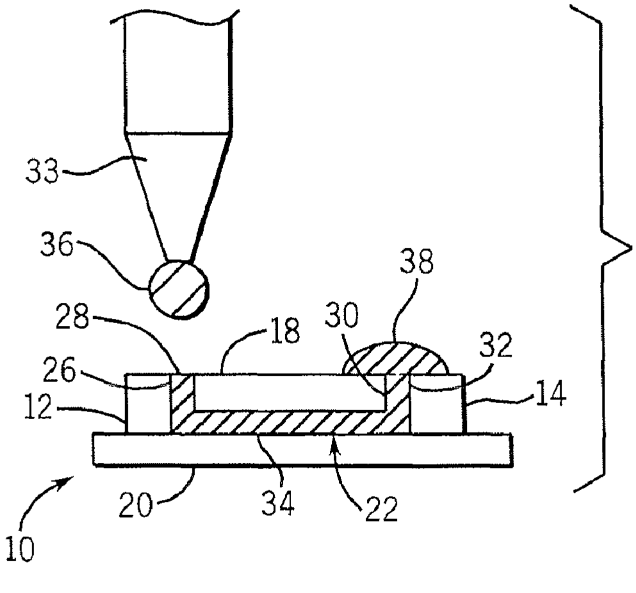
FIG. 3 is an enlarged, schematic view of the robotic micropipetting station of FIG. 1 showing the depositing of a drop of liquid on the upper surface of a microfluidic device by a micropipette.
Figure 4:
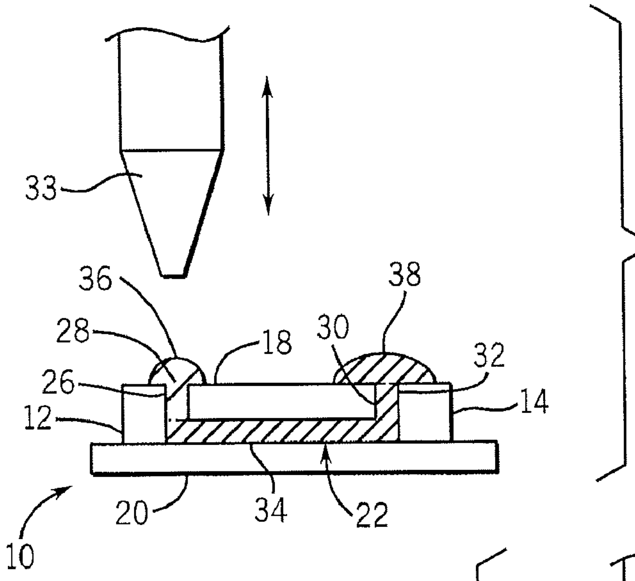
FIG. 4 is a schematic view, similar to FIG. 3, showing the drop of liquid deposited on the upper surface of the microfluidic device by the micropipette.
Figure 5:
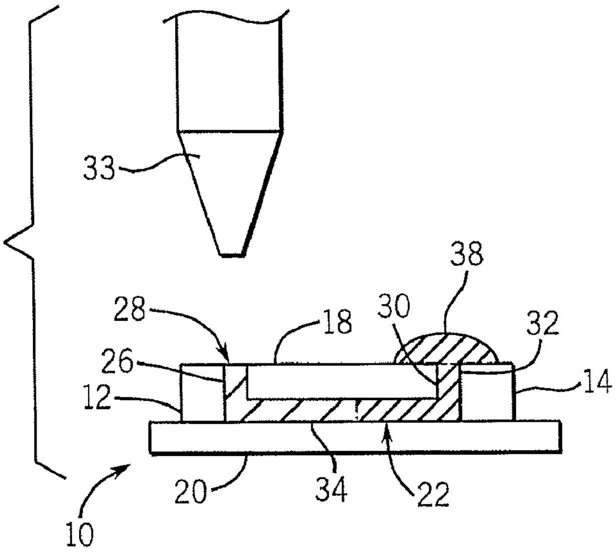
FIG. 5 is a schematic view, similar to FIGS. 3 and 4, showing the drop of liquid flowing into a channel of the microfluidic device by the micropipette.
Figure 6:
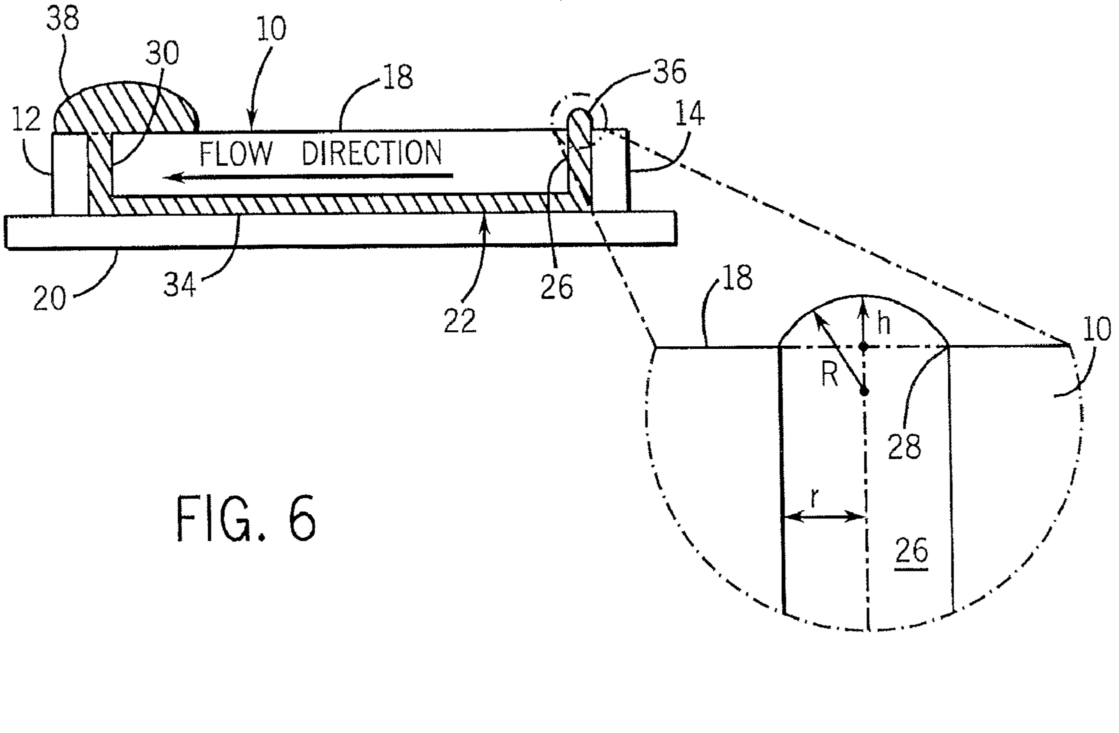
FIG. 6 is an enlarged, schematic view showing the dimensions of the drop of liquid deposited on the upper surface of the microfluidic device by the micropipette.

A robotic micropipetting station 31 is provided and includes micropipette 33 for depositing drops of liquid, such as pumping drop 36 and reservoir drop 38, on upper surface 18 of microfluidic device 10, for reasons hereinafter described. Modern high-throughput systems, such as robotic micropipetting station 31, are robotic systems designed solely to position a tray (i.e. multiwell plate 35, FIG. 2, or microfluidic device 10, FIG. 1) and to dispense or withdraw microliter drops into or out of that tray at user desired locations (i.e. well 34 of multiwell plate 35 or the input and output ports 28 and 32, respectively, of channel 22 of microfluidic device 10) with a high degree of speed, precision, and repeatability.

The amount of pressure present within a pumping drop 36 of liquid at an air-liquid interface is given by the Young-LaPlace equation:

$$\Delta P=\gamma(1/R1+1/R2) \qquad \text{Equation (1)}$$

wherein γ is the surface free energy of the liquid; and R1 and R2 are the radii of curvature for two axes normal to each other that describe the curvature of the surface of pumping drop 36.

For spherical drops, Equation (1) may be rewritten as:

$$\Delta P=2\gamma/R \qquad \text{Equation (2)}$$

wherein: R is the radius of the spherical pumping drop 36, FIG. 6.

From Equation (2), it can be seen that smaller drops have a higher internal pressure than larger drops. Therefore, if two drops of different size are connected via a fluid-filled tube (i.e. channel 22), the smaller drop will shrink while the larger one grows in size. One manifestation of this effect is the pulmonary phenomenon called "instability of the alveoli" which is a condition in which large alveoli continue to grow while smaller ones shrink. In view of the foregoing, it can be appreciated that fluid can be pumped through channel 22 by using the surface tension in pumping drop 36, as well as, input port 28 and output port 32 of channel 22.

In accordance with the pumping method of the present invention, fluid is provided in channel 22 of microfluidic device 10. Thereafter, a large reservoir drop 38 (e.g., 100 μL), is deposited by micropipette 33 over output port 32 of channel 22, FIG. 3. The radius of reservoir drop 38 is greater than the radius of output port 32 and is of sufficient dimension that the pressure at output port 32 of channel 22 is essentially zero. A pumping drop 36, of significantly smaller dimension than reservoir drop 38, (e.g., 0.5-5 μL), is deposited on input port 28 of channel 22, FIGS. 4 and 6, by micropipette 33 of robotic micropipetting station 31, FIG. 1. Pumping drop 36 may be hemispherical in shape or may be other shapes. As such, it is contemplated that the shape and the volume of pumping drop 36 be defined by the hydrophobic/hydrophilic patterning of the surface surrounding input port 28 in order to extend the pumping time of the method of the present invention. As heretofore described, microfluidic device 10 is formed from PDMS which has a high hydrophobicity and has a tendency to maintain the hemispherical shapes of pumping drop 36 and reservoir drop 38 on input and output ports 28 and 32, respectively. It is contemplated as being within the scope of the present invention that the fluid in channel 22, pumping drops 36 and reservoir drop 38 be the same liquid or different liquids.

Because pumping drop 36 has a smaller radius than reservoir drop 38, a larger pressure exists on the input port 28 of channel 22. The resulting pressure gradient causes the pumping drop 36 to flow from input port 28 through channel 22 towards reservoir drop 38 over output port 32 of channel 22, FIG. 5. It can be understood that by sequentially depositing additional pumping drops 36 on input port 28 of channel 22 by micropipette 33 of robotic micropipetting station 31, the resulting pressure gradient will cause the pumping drops 36 deposited on input port 28 to flow through channel 22 towards reservoir drop 38 over output port 32 of channel 22. As a result, fluid flows through channel 22 from input port 28 to output port 32.

Referring back to FIG. 6, the highest pressure attainable for a given radius, R, of input port 28 of channel 22 is a hemispherical drop whose radius is equal to the radius, r, of input port 28 of channel 22. Any deviation from this size, either larger or smaller, results in a lower pressure. As such, it is preferred that the radius of each pumping drop 36 be generally equal to the radius of input port 28. The radius (i.e., the radius which determines the pressure) of pumping drop 36 can be determined by first solving for the height, h, that pumping drop 36 rises above a corresponding port, i.e. input port 28 of channel 22. The pumping drop 36 radius can be calculated according to the expression:

$$R = \left[\frac{3V}{\pi} + h^3\right]\frac{1}{3h^2} \qquad \text{Equation (3)}$$

wherein: R is the radius of pumping drop 36; V is the user selected volume of the first pumping drop; and h is the height of pumping drop 36 above upper surface 18 of microfluidic device 10.

The height of pumping drop 36 of volume V can be found if the radius of the spherical cap is also known. In the present application, radius of the input port 28 is the spherical cap radius. As such, the height of pumping drop 36 may be calculated according to the expression:

$$h = \frac{1}{6}\left[108b + 12\left(12a^3 + 81b^2\right)^{\frac{1}{2}}\right]^{\frac{1}{3}} - \frac{2a}{\left[108b + 12\left(12a^3 + 81b^2\right)^{\frac{1}{2}}\right]^{\frac{1}{3}}} \qquad \text{Equation (4)}$$

wherein: $a=3r^2$ (r is the radius of input port 28); and $b=6V/\pi$ (V is the volume of pumping drop 36 placed on input port 28).

The volumetric flow rate of the fluid flowing from input port 28 of channel 22 to output port 32 of channel 22 will change with respect to the volume of pumping drop 36. Therefore, the volumetric flow rate or change in volume with respect to time can be calculated using the equation:

$$\frac{dV}{dt} = \frac{1}{Z}\left(\rho g h - \frac{2\gamma}{R}\right) \qquad \text{Equation (5)}$$

wherein: dV/dt is the rate of fluid flowing through channel 22; Z is the flow resistance of channel 22; ρ is the density of pumping drop 36; g is gravity; h is the height of reservoir drop 38; γ is the surface free energy of pumping drop 36; and R is the radius of the pumping drops 36.

It is contemplated that various applications of the method of the present invention are possible without deviating from the present invention. By way of example, multiple input ports could be formed along the length of channel 22. By designating one of such ports as the output port, different flow rates could be achieved by depositing pumping drops on different input ports along length of channel 22 (due to the difference in channel resistance). In addition, temporary output ports 32 may be used to cause fluid to flow into them, mix, and then, in turn, be pumped to other output ports 32. It can be appreciated that the pumping method of the present invention works with various types of fluids including water and biological fluids. As such fluid media containing cells and fetal bovine serum may be used to repeatedly flow cells down channel 22 without harming them.

Further, it is contemplated to etch patterns in upper surface 18 of microfluidic device 10 about the outer peripheries of input port 28 and/or output port 32, respectively, in order to alter the corresponding configurations of pumping drop 36 and reservoir drop 38 deposited thereon. By altering the configurations of pumping and reservoir drops 36 and 38, respectively, it can be appreciated that the volumetric flow rate of fluid through channel 22 of microfluidic device 10 may be modified. In addition, by etching the patterns in upper surface 18 of microfluidic device 10, it can be appreciated that the time period during which the pumping of the fluid through channel 22 of microfluidic device 10 takes place may be increased or decreased to a user desired time period.

As described, there are several benefits to use of the pumping method of the present invention. By way of example, the pumping method of the present invention allows high-throughput robotic assaying systems to directly interface with microfluidic device 10 and pump liquid using only micropipette 33. In a lab setting manual pipettes can also be used, eliminating the need for expensive pumping equipment. Because the method of the present invention relies on surface tension effects, it is robust enough to allow fluid to be pumped in microfluidic device 10 in environments where physical or electrical noise is present. The pumping rates are determined by the volume of pumping drop 36 present on input port 28 of the channel 22, which is controllable to a high degree of precision with modern robotic micropipetting stations 31. The combination of these factors allows for a pumping method suitable for use in a variety of situations and applications.

Figure 7:
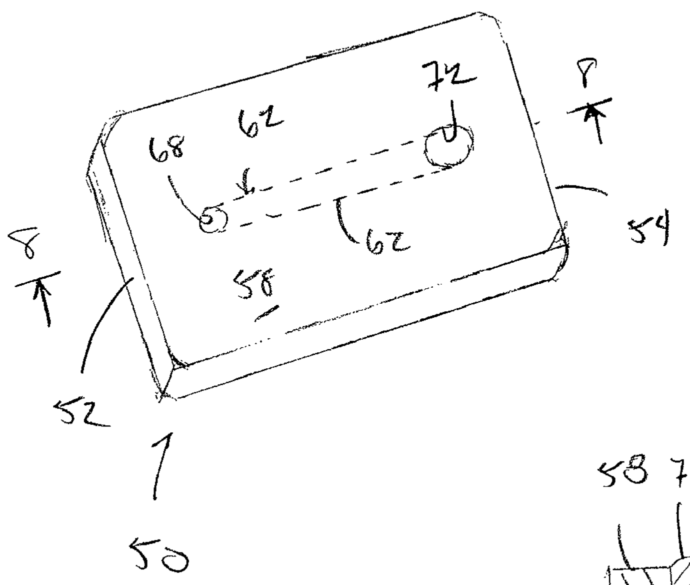
FIG. 7 is an isometric view of an alternate embodiment of a microfluidic device for use in the methodology of the present invention.
Figure 8:
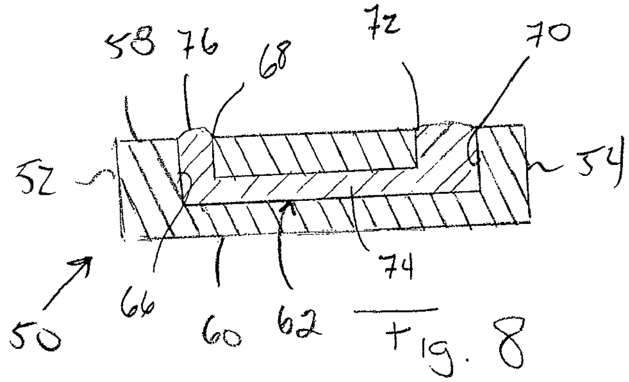
FIG. 8 is a cross sectional view of the microfluidic device taken along line 8-8 of FIG. 7.

Referring to FIGS. 7 and 8, an alternate embodiment of a microfluidic device for use in the methodology of the present invention is generally designated by the reference numeral 50. Microfluidic device 50 may be foamed from polydimethylsiloxane (PDMS), for reasons hereinafter described, and has first and second ends 52 and 54, respectively, and upper and lower surfaces 58 and 60, respectively. Channel 62 extends through microfluidic device 50 and includes first vertical portion 66 terminating at input port 68 that communicates with upper surface 58 of microfluidic device 50 and second vertical portion 70 terminating at output port 72 that also communicates with upper surface 58 of microfluidic device 50. First and second vertical portions 66 and 70, respectively, of channel 62 are interconnected by and communicate with horizontal portion 74 of channel 62.

In accordance with the pumping method of the present invention, fluid is provided in channel 62 of microfluidic device 50. Pumping drop 76 of substantially the same dimension as input port 68 of channel 62 is deposited thereon by micropipette 33 of robotic micropipetting station 31, FIG. 1. Pumping drop 76 may be hemispherical in shape or may be other shapes. As such, it is contemplated that the shape and the volume of pumping drop 76 be defined by the hydrophobic/hydrophilic patterning of the surface surrounding input port 68 in order to extend the pumping time of the method of the present invention. As heretofore described, microfluidic device 60 is formed from PDMS which has a high hydrophobicity and has a tendency to maintain the hemispherical shape of pumping drop 76 on input port 68.

It is contemplated for pumping drop 76 deposited on input port 68 to have a predetermined effective radius of curvature that is less than the effective radius of the curvature of the fluid at output port 72 of channel 62, for reasons hereinafter described. As is known, the effective radius of curvature of a drop can be calculated according to the equation:

$$RC=(R1\times R2)/(R1+R2) \quad \text{Equation (6)}$$

wherein RC is the radius of curvature; and R1 and R2 are the radii of the drop on orthogonal axes. In the case of a circle, R1 and R2 are equal. For an ellipse, R1 and R2 would be the radii of the major and minor axes respectively.

Referring to Equations (1) and (2), supra., it can be appreciated that drops having a smaller radius of curvature have a higher internal pressure. Therefore, if pumping drop 76 is connected to output port 72 via a fluid-filled tube (i.e. channel 62), the pumping drop 76 will shrink and the fluid at output port 72 will grow if pumping drop 76 at input port 68 has a smaller radius of curvature than the meniscus of the fluid at output port 72. As previously noted, the highest pressure attainable for a given radius, R, of pressure drop 76 at input port 68 of channel 62 is a hemispherical drop whose radius is equal to the radius, r, of input port 68 of channel 62. As such, by depositing pumping drop 76 on input port 68, the internal pressure of pumping drop 76 generates a pressure gradient that causes pumping drop 76 to flow from input port 68 through channel 62 towards reservoir output port 72 of channel 62. It can be understood that by sequentially depositing additional pumping drops 76 on input port 68 of channel 62 by micropipette 33 of robotic micropipetting station 31, the resulting pressure gradient will cause pumping drops 76 deposited on input port 68 to flow through channel 62 towards output port 72 of channel 62. As a result, fluid flows through channel 62 from input port 68 to output port 72.

As heretofore described, the volumetric flow rate of the fluid flowing from input port 68 of channel 62 to output port 72 of channel 62 will change with respect to the volume of pumping drop 76. Therefore, the volumetric flow rate or change in volume with respect to time can be calculated using the equation:

$$\frac{dV}{dt} = \frac{1}{Z}\left(\rho gh - \frac{2\gamma}{R}\right) \quad \text{Equation (7)}$$

wherein: dV/dt is the rate of fluid flowing through channel 62; Z is the flow resistance of channel 62; ρ is the density of the fluid at output port 72; g is gravity; h is the height of the fluid (the meniscus) at output port 72; γ is the surface free energy of pumping drop 76; and R is the radius of the pumping drops 76.

Figure 9:
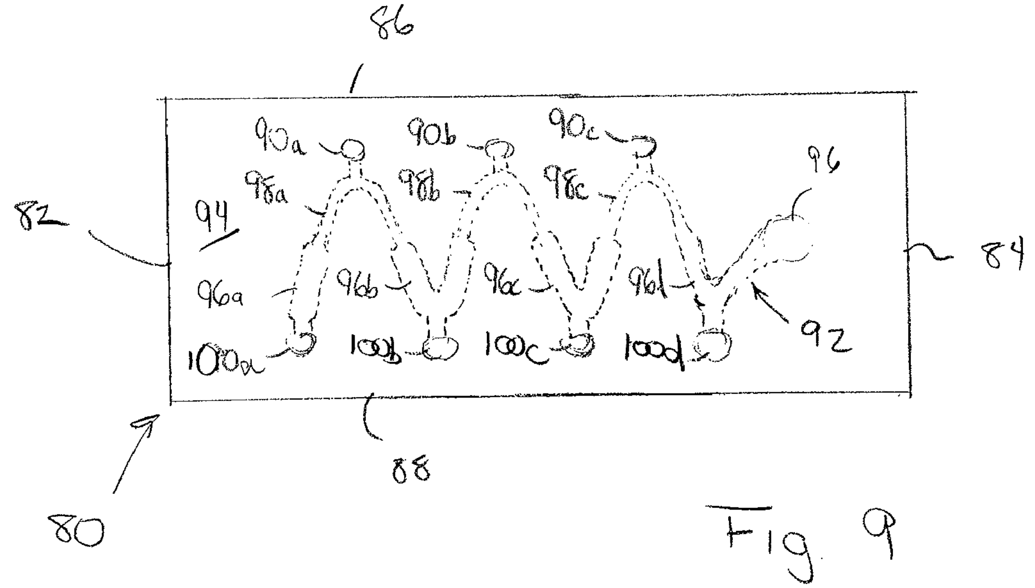
FIG. 9 is a top plan view of a still further embodiment of a microfluidic device for use in the methodology of the present invention.

It is contemplated to vary the volumetric flow rate of the fluid flowing from an input port of a channel though a microfluidic device to an output port of the channel by varying the flow resistance of the channel. Referring to FIG. 9, a still further embodiment of a microfluidic device for effectuating a method in accordance with the present invention is generally designated by the reference numeral 80. Microfluidic device 80 includes first and second ends 82 and 84, respectively, and first and second sides 86 and 88, respectively. By way of example, a generally sinusoidal-shaped channel 92 extends through microfluidic device 80. It can be appreciated that channel 92 may have other configurations without deviating from the scope of the present invention. Channel 92 terminates at output port 96 that communicates with upper surface 94 of microfluidic device 80. Channel 92 further includes a plurality of enlarged diameter portions **96*a*-96*d* and a plurality of reduced diameter portions 98*a*-98*c*. Enlarged diameter portions 96*a*-96*d* alternate with corresponding reduced diameter portions 98*a*-98*c***, for reasons hereinafter described.

Input ports **90*a*-90*c* communicate with upper surface 94 of microfluidic device 80 and with corresponding reduced diameter portions 98*a*-98*c*, respectively, of channel 92. Input ports 100*a*-100*d* communicate with upper surface 94 of microfluidic device 80 and with corresponding enlarged diameter portions 96*a*-96*d*, respectively, of channel 92. Input ports 90*a*-90*c* and 100*a*-100*d* have generally identical dimensions. As depicted in FIG. 9, input ports 90*a*-90*c* and 100*a*-100*d* are spaced along the sinusoidal path of channel 92 such that each input port 90*a*-90*c* and 100*a*-100*d* is a corresponding, predetermined distance from output port 96**.

In operation, fluid is provided in channel 92 of microfluidic device 80. A pumping drop of substantially the same dimension as input ports **90*a*-90*c* and 100*a*-100*d* of channel 92 is deposited on one of the input ports 90*a*-90*c* and 100*a*-100*d* by micropipette 33 of robotic micropipetting station 31, FIG. 1. As heretofore described, the pumping drop may be hemispherical in shape or may be other shapes. As such, it is contemplated that the shape and the volume of pumping drop be defined by the hydrophobic/hydrophilic patterning of the surface surrounding the input port on which the pumping drop is deposited in order to extend the pumping time of the method of the present invention. As previously noted, microfluidic device 80** is formed from PDMS which has a high hydrophobicity and has a tendency to maintain the hemispherical shape of the pumping drop on its corresponding input port.

It is contemplated for the pumping drop deposited on a selected input port 90*a*-90*c* and 100*a*-100*d* to have a predetermined effective radius of curvature that is less than the effective radius of the curvature of the fluid at output port 96 of channel 92. As previously noted, the highest pressure attainable for a given radius, R, of the pressure drop at the selected input port 90*a*-90*c* and 100*a*-100*d* of channel 92 is a hemispherical drop whose radius is equal to the radius, r, of the selected input port of channel 92. By depositing the pumping drop on the selected input port, the internal pressure of the pumping drop on the selected input port generates a pressure gradient that causes the pumping drop to flow from the selected input port through channel 92 towards output port 96 of channel 92. Since the input ports 90*a*-90*c* and 100*a*-100*d* have identical dimensions, fluid does not flow to the non-selected input ports. It can be understood that by sequentially depositing additional pumping drops on the selected input port of channel 92 by micropipette 33 of robotic micropipetting station 31, the fluid flows through channel 92 from the selected input port to output port 96.

It is contemplated to vary the volumetric flow rate of the fluid flowing from the selected input port of channel 92 though a microfluidic device to output port 96 of channel 92 by varying the flow resistance of channel 92. It can be appreciated that the flow resistance of channel 92 is dependent upon on the input port 90*a*-90*c* and 100*a*-100*d* selected. More specifically, the flow resistance of channel 92 is greater in reduced diameter portions 98*a*-98*c*. As a result, the fastest volumetric flow rate of the fluid flowing through channel 92 occurs when the pumping drops are deposited on input port 100*d*. On the other hand, the slowest volumetric flow rate of the fluid flowing through channel 92 occurs when the pumping drops are deposited on input port 100*d* wherein the fluid must pass through reduced diameter portions 98*a*-98*c*. It can be appreciated that by depositing the pumping drops on input ports 90*a*-90*c* and 100*b*-100*c*, the volumetric flow rate of the fluid flowing through channel 92 can be adjusted between the fastest and slowest flow rate.

Various modes of carrying out the invention are contemplated as being within the scope of the following claims particularly pointing out and distinctly claiming the subject matter, which is regarded as the invention.

We claimed:

1. A method of pumping sample fluid through a channel of a microfluidic device, comprising the steps of:

providing the channel with an input and an output;

filling the channel with a channel fluid; and depositing a first pumping drop of the sample fluid at the input of the channel such that the first pumping drop flows into the channel through the input;

wherein the first pumping drop has an effective radius of curvature and the fluid at the output has an effective radius of curvature, the effective radius of curvature of the fluid at the output being greater than the effective radius of curvature of the first pumping drop.

2. The method of claim 1 comprising the additional step of depositing a second pumping drop of the sample fluid at the input of the channel after the first pumping drop flows into the channel.

3. The method of claim 1 wherein the input of the channel has a predetermined radius and wherein the first pumping drop has a radius generally equal to the predetermined radius of the input of the channel.

4. The method of claim 3 wherein the first pumping drop has a user selected volume and projects a height above the microfluidic device when deposited at the input of the channel and wherein the radius of the first pumping drop is calculated according to the expression:

$$R = \left[\frac{3V}{\pi} + h^3\right]\frac{1}{3h^2}$$

wherein: R is the radius of the first pumping drop; V is the user selected volume of the first pumping drop; and h is the height of the first pumping drop above the microfluidic device.

5. The method of claim 1 comprising the additional step of sequentially depositing a plurality of pumping drops at the input of the channel after the first pumping drop flows into the channel.

6. The method of claim 5 wherein each of the plurality of pumping drops is sequentially deposited at the input of the channel as the previously deposited pumping drop flows into the channel.

7. The method of claim 5 wherein the first pumping drop has a volume and wherein the plurality of pumping drops have volumes generally equal to the volume of the first pumping drop.

8. The method of claim 1 wherein the channel fluid is the sample fluid.

9. The method of claim 1 comprising the additional step of varying the flow rate of first pumping drop through the channel.

10. The method of claim 9 wherein the channel has a cross-sectional area and wherein step of the flow rate of first pumping drop through the channel includes the step of reducing the cross-sectional area of at least a portion of the channel.

11. The method of claim 1 wherein the output of the channel has a generally circular configuration.

12. The method of claim 1 wherein an area adjacent to the output is hydrophobic.

13. The method of claim 1 wherein the fluid at the output has a meniscus and wherein the radius of curvature of the fluid at the output is taken at the meniscus.

* * * * *

UNITED STATES PATENT AND TRADEMARK OFFICE

CERTIFICATE OF CORRECTION

PATENT NO. : 8,053,249 B2
APPLICATION NO. : 11/684949
DATED : November 8, 2011
INVENTOR(S) : David J. Beebe et al.

It is certified that error appears in the above-identified patent and that said Letters Patent is hereby corrected as shown below:

IN THE SPECIFICATION

Column 1, lines 6-9, Please amend the "Reference to Government Grant" language to read: -- This invention was made with government support under CA104162 awarded by the National Institutes of Health and W81XWH-04-1-0572 awarded by the ARMY/MRMC. The government has certain rights in the invention. --

Signed and Sealed this
Second Day of September, 2014

Michelle K. Lee

Michelle K. Lee
*Deputy Director of the United States Patent and Trademark Office*